United States Patent [19]
Ogiso et al.

[11] 3,726,200
[45] Apr. 10, 1973

[54] ELECTRONIC SHUTTER FOR CAMERAS

[75] Inventors: Mitsutoshi Ogiso; Mitsuo Ishikawa, both of Kawasaki, Japan

[73] Assignee: Canon Kabushiki Kaisha, Tokyo, Japan

[22] Filed: Nov. 18, 1970

[21] Appl. No.: 90,580

[30] Foreign Application Priority Data

Nov. 24, 1969 Japan ....................44/94529
Nov. 24, 1969 Japan ....................44/94530

[52] U.S. Cl. ..............95/53.3, 95/10 CT, 95/53 EA
[51] Int. Cl. ....................G03b 9/64, G03b 9/62
[58] Field of Search ..............95/53 E, 53.3, 53 EA, 95/10 CT

[56] References Cited

UNITED STATES PATENTS

| | | | |
|---|---|---|---|
| 3,526,183 | 9/1970 | Hartl | 95/53.3 X |
| 3,223,013 | 12/1965 | Rentschler | 95/53.3 |

*Primary Examiner*—Samuel S. Matthews
*Assistant Examiner*—Russell E. Adams, Jr.
*Attorney*—Anton J. Wille

[57] ABSTRACT

The electronic shutter for cameras incorporates a self-timer which comprises a time constant circuit and a control circuit for controlling the delayed time so that just before the completion of the action of the self-timer a warning device such as a lamp, buzzer or the like is actuated for giving the warning signal.

10 Claims, 5 Drawing Figures

ELECTRONIC SHUTTER FOR CAMERAS

The present invention relates to an electronic shutter incorporating an electronic self-timer and a device for warning the completion of a time delay action of the electronic self-timer.

Known is a timing circuit, especially an input circuit of an electronic shutter in which a common capacitor is employed in a charging and discharging circuit each having a different time constant so that two time control actions may be accomplished successively by utilizing the charging and discharging characteristics of the charging and discharging circuits.

There have been proposed various electronic self-timers which utilize the time constant circuits in the electronic shutters. These electronic self-timers have a common defect as in the case of the mechanical self-timers that the time delaying action of these self-timers is difficult to be detected from the exterior of the self-timers. Therefore, a photographer as well as those included in a picture do not know conveniently when the time delay action of the self-timer is completed, that is, when the exposure is started.

It is therefore one of the objects of the present invention to provide an improved electronic shutter.

It is another object of the present invention is to control an electronic self-timer and indicate the action thereof by utilizing the charging characteristic and control an electronic shutter by utilizing the discharge characteristic.

According to one aspect of the present invention, the action of the self-timer may be easily recognized so that people may be prepared for the moment when the shutter is released.

According to another aspect of the present invention, an electronic self-timer has a time constant circuit and a control circuit for controlling the time so that a predetermined time before the completion of the action of the electronic self-timer a warning device such as a lamp, a buzzer or the like is actuated for giving the warning that the action of the self-timer is to be completed very soon and that the exposure is to be started.

The present invention will become more apparent from the following description of the preferred embodiments thereof taken in conjunction with the accompanying drawing.

Figure 3:
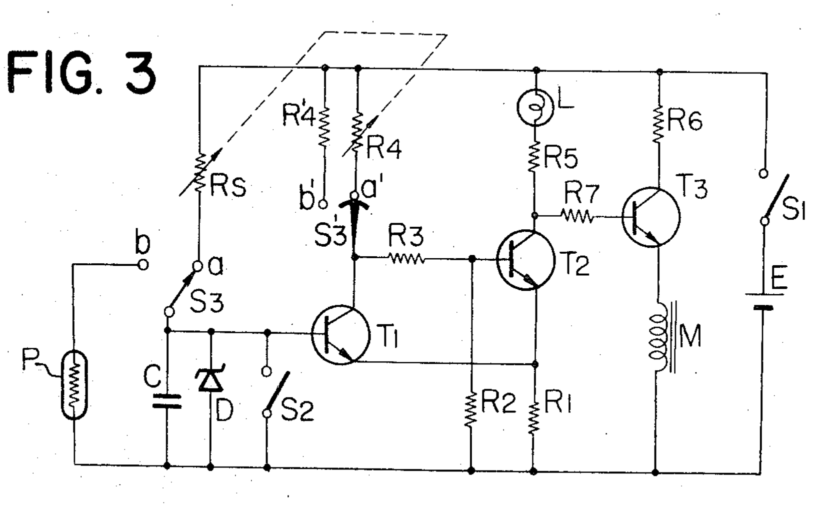
Figure 4:
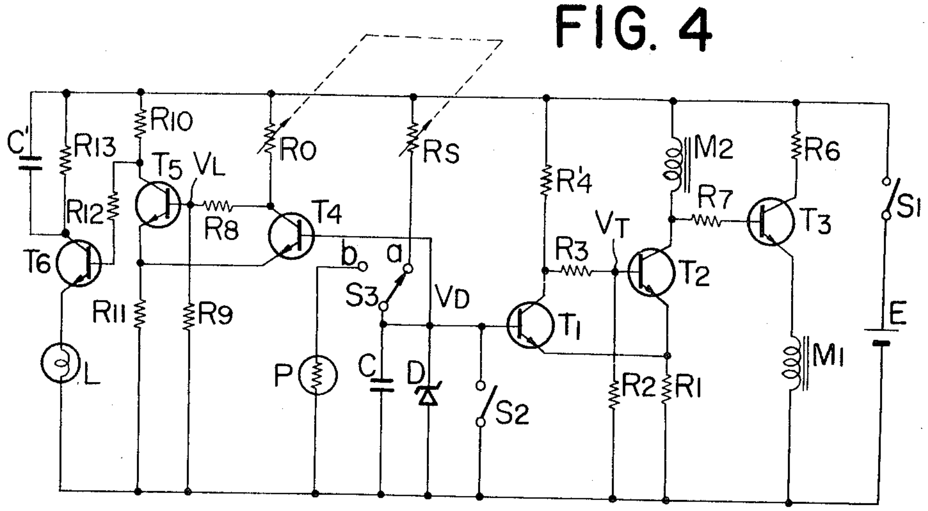
Figure 5:
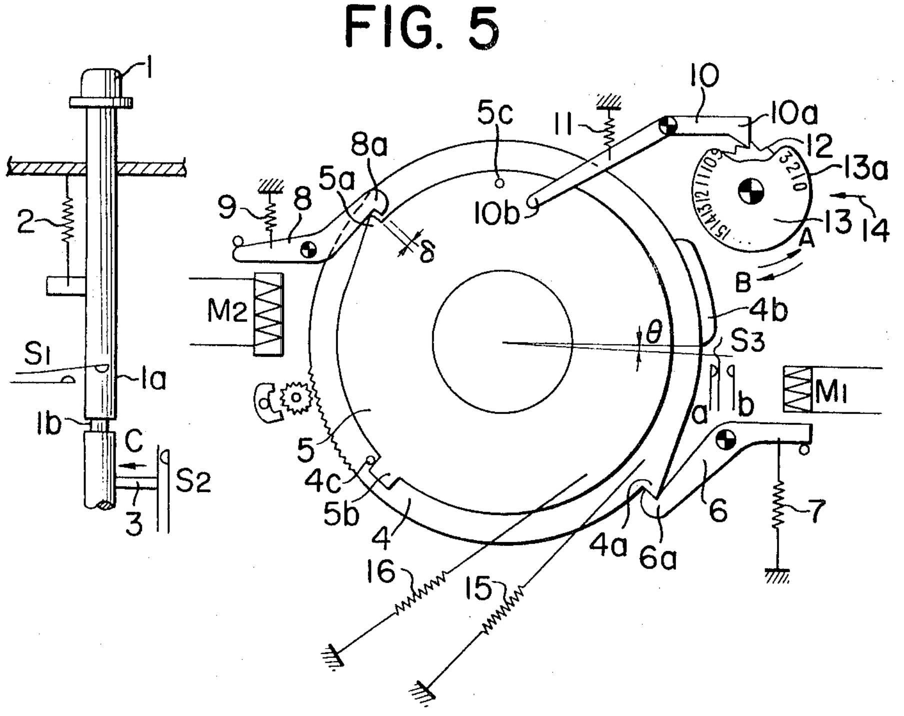

FIG. 3 is a circuit diagram of another embodiment of the electronic shutter with a warning device for warning the completion of the action of an electronic self-timer in accordance with the present invention; and FIG. 4 is a circuit diagram of a still another embodiment of the electronic shutter with a device for warning the completion of the action of an electronic self-timer in accordance with the present invention; and FIG. 5 is a schematic diagram partially illustrating the mechanical components of the electronic shutter in accordance with the present invention.

Figure 1:
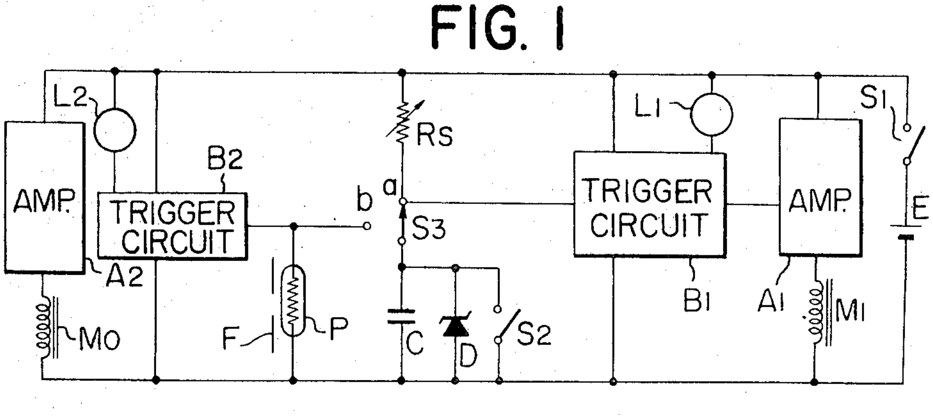
FIG. 1 is a block diagram of a first embodiment of an electronic shutter incorporating an electronic self-timer in accordance with the present invention.

FIG. 1 is a block diagram of an electronic shutter incorporating an electronic self-timer in accordance with the present invention. A main switch $S_1$ cooperates with a shutter release button (not shown) and a second switch $S_2$ is opened immediately when a self-timer starts to measure the time while a third switch $S_3$ is actuated by a magnet $M_1$ at the end of actuation of the self-timer so as to switch the movable contact from a contact or terminal *a* to *b*. The electronic shutter further includes a photosensitive resistor P such as a photoconductive cell, a constant voltage element D such as a Zener diode, a variable resistor $R_s$ for setting a time to be delayed by the self-timer, an element F such as a stop disposed in front of the photoconductive cell P for varying the quantity of transmitted light, a trigger circuit $B_1$, a lamp $L_1$ for indication of the actuation of the self-timer and an amplifier $A_1$ for driving the magnet $M_1$. When the movable contact of the switch $S_3$ is switched from the contact *a* to *b*, a shutter opening mechanism is energized.

The electron charges charged during the actuation of the self-timer is discharged through the photoconductive element P and the actuation of the self-timer is indicated by a lamp $L_2$ while a magnet $M_0$ energizes a shutter closing mechanism. The electronic shutter further includes a trigger circuit, an amplifier for driving the magnet $M_0$ and a power source E.

Figure 2:
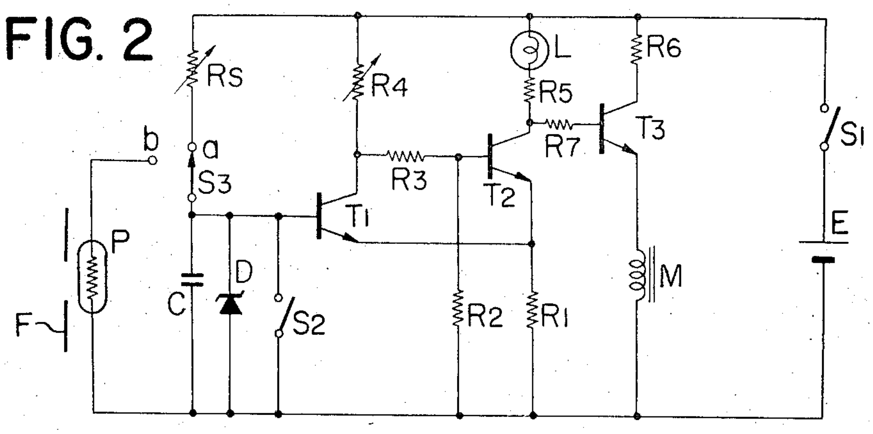
FIG. 2 is a practical electric circuit diagram of the shutter shown in FIG. 1.

FIG. 2 is a practical electric circuit diagram of the electronic shutter in which the amplifiers $B_1$ and $B_2$ shown in FIG. 1 are designed as a common Schmitt circuit and the amplifiers $A_1$ and $A_2$ for driving the magnets $M_1$ and $M_0$ shown in FIG. 1 are designed by a common inverting amplifier utilizing a transistor $Tr_3$ for driving a common magnet M instead of the magnets $M_1$ and $M_0$. Instead of the lamps $L_1$ and $L_2$ a common lamp L is employed. Reference characters $T_1$ and $T_2$ designate transistors in the Schmitt circuit and $R_1$, $R_2$, $R_3$, $R_5$, $R_6$ and $R_7$ are resistors. A variable resistor $R_4$ is for varying the the loop gain of the Schmitt circuit, that is for varying the hysterisis.

Next the mode of operation will be described with reference to FIG. 2. When the film is advanced, the switch $S_1$ is opened, the switch $S_2$ is closed and the switch $S_3$ is switched to the contact *a*. A delayed time is set by the variable resistor $R_s$ and thereafter the shutter release button (not shown) is depressed so that the switch $S_1$ is closed and locked in the closed position while the switch $S_2$ is opened. In consequence, the delayed time set is measured by the time constant circuit comprising the variable resistor $R_s$ and the capacitor C when the capacitor C is charged. When the switch $S_1$ is closed, the Schmitt circuit comprising the transistors $T_1$ and $T_2$ is energized so that the lamp L is lighted for indicating the actuation of the self-timer. After the switch $S_2$ is opened, the transistor $T_2$ is rendered into the non-conductive state after a time interval determined by the $R_sC$ circuit so that the lamp L is turned off for indicating the completion of the time measuring action of the self-timer. Thereafter, the transistor $T_3$ is rendered into the conductive state so that the magnet M is energized. In consequence, the switch $S_3$ is switched from the contact *a* to *b* while the electron charges charged in the capacitor C is discharged through the photoconductive cell P. Since the shutter opening mechanism is actuated by the magnet M, the film is being exposed. The transistor $T_3$ is turned off after a time interval determined by the P·C time constant circuit so that the magnet M is deenergized. Subsequently the shutter closing mechanism is actuated, thereby to close the shutter.

The Zener diode D serves to maintain at a predetermined level the charging voltage when the shutter is opened. The trigger circuits $B_1$ and $B_2$ and the amplifiers $A_1$ and $A_2$ have been shown as being the common circuit comprising the Schmitt circuit and the inverting amplifier circuit, but it is to be understood that the present invention is not limited thereto.

FIG. 3 is a circuit diagram of another embodiment of the electronic shutter with a device for warning or previously indicating the completion of time-measuring action of the electronic self-timer in accordance with the present invention. $S_1$ designates a power source switch; $S_2$, a self-timer start switch and $S_3$ a switch which cooperates with a switch $S_3'$ and whose movable contact is switched to a fixed contact *b* by a magnet M for starting the first shutter blind of the camera. The magnet M also actuates the shutter closing mechanism. $T_1$ and $T_2$ designate transistors constituting the Schmitt circuit and $T_3$, a transistor for amplifying the output from this Schmitt circuit. $R_1 - R_7$ designate transistors; $R_4$ is a resistor which is in the circuitry only when the self-timer is actuated; L, a warning lamp; D, a Zener diode; C, a capacitor; and P, a resistor such as a photoconductive cell.

The device of the present invention described above has a novel feature that the value of the variable resistor R*s* in the time-constant circuit for setting a time to be delayed by the self-timer and the value of the resistor $R_4$ for controlling the operating point of the control circuit such as the Schmitt circuit are adjusted in unison with each other so that an alarming device such as a lamp may be actuated at a predetermined time before the completion of the time-delaying action of the self-timer independently of the value of the variable resistor R*s* in the time-constant circuit.

Next the mode of operation will be described. It is assumed that when the main switch $S_1$ is closed, the switches $S_3$ and $S_3'$ are switched to the fixed contacts *a* and *a'* respectively. When the switch $S_2$ is closed, the capacitor C is charged and after a predetermined time interval, the transistor $T_2$ is turned off, the lamp L is also turned off and the transistor $T_3$ is turned on so that the magnet M is energized, thereby to switch the switches $S_3$ and $S_3'$ from the fixed contacts *a* and *a'* to *b* and *b'* respectively through a suitable time delay means. Prior to the switching of the switch $S_3$, the capacitor C is charged to a predetermined level determined by the Zener diode D. When the switches $S_3$ and $S_3'$ are switched to the fixed contacts *b* and *b'*, the first shutter blind starts to travel and after a predetermined time, the magnet M is de-energized so that the second shutter blind starts to travel. The switch $S_2$ is so arranged as to be closed while the switches $S_3$ and $S_3'$ are switched to the fixed contacts *a* and a' respectively when the second shutter blind starts to travel so that all of these switches $S_2$, $S_3$ and $S_3'$ are reset to the initial positions. The operation will be more stabilized when a make-before-break-contact type switch is employed as the switch $S_3'$ so that the movable contact or pole may be brought into contact with both of the fixed contacts or terminals (*a'* and *b'*) before it is switched from one contact or terminal (*a'*) to the other (*b'*). The resistors $R_s$ and $R_4$ may be interlocked when the self-timer is actuated but this interlocking is released when the electronic shutter circuit is actuated so that the knob of the switch $S_3'$ may be returned to its initial position while the value of the resistor $R_4$ may be set to the same value with that of the resistor $R_4'$ in the electronic shutter circuit.

FIG. 4 is a circuit diagram of a second embodiment of the electronic shutter with a device for warning the completion of the time delaying action of the electronic self-timer in accordance with the present invention and FIG. 5 is a schematic view illustrating the mechanical components thereof. In FIG. 4, P designates a resistive means such as a photoconductive cell; D, a constant voltage element such as a Zener diode; $M_1$ and $M_2$, magnets; Rs a variable resistor for setting a time to be delayed by the self-timer; R*o*, a variable resistor for varying the sensitivity of the Schmitt circuit consisting of transistors $T_4$ and $T_5$; $S_1$, a main or power source switch; $S_2$, a self-timer starting switch; $S_3$, a switch which is switched when the action of the self-timer is completed so that the exposure is started; $T_1$ and $T_2$, transistors constituting the Schmitt circuit; $T_3$, a transistor for amplifying the output of the Schmitt circuit; $R_1$, $R_2$, $R_3$, $R_4$, $R_6$ and $R_7$, resistors; and $R_8 - R_{13}$, resistors which may be in the circuitry with other components when required. $T_6$ designates a transistor for amplifying the output of the Schmitt circuit consisting of the transistors $T_4$ and $T_5$; L, a lamp; C', an auxiliary capacitor; and E, a battery.

In FIG. 5, reference numeral 1 designates a shutter release button; 1*a*, an electrically non-conductive rod member extending from the shutter release button 1 for actuating the switch $S_1$; 1*b*, an annular groove formed around the shutter release rod 1*a* for engagement with a lever 3 when the button 1 is depressed; and the lever 3 which is normally biased in the direction C by a spring (not shown) is fitted into the groove 1b when the shutter is released so as to prevent the shutter release rod 1*a* from returning to its initial position and to open the switch $S_2$. Reference numeral 2 designates a spring for returning the shutter release rod 1a to its initial position; 4, a ring for opening the shutter blades; 5, a ring for closing the shutter blades; 6, a hooked lever for locking the shutter opening ring 4 in position in coaction with the magnet $M_1$; 7, a spring for biasing the lever 6 in the counterclockwise direction; 8, a hooked lever for locking the shutter closing ring 5 in position in coaction with the magnet $M_2$; and 9, a spring for biasing the lever 8 in the clockwise direction.

A stepped portion or detent 4*a* integral with the ring 4 is shown as being in engagement with the hooked portion 6*a* of the lever 6. A projection 4*b* extending from the ring 4 serves to switch the movable contact of the switch $S_3$ from the fixed contact or terminal *a* to *b*. The angle of play is designated by $\theta$. A pin 4*c* of the ring 4 is for engagement with a projection 5*b* of the ring 5 and is located in a predetermined relation with the hook 8*a* of the lever 8. The relative position of the pin 4*c* with respect to the hook 8*a* may be adjusted by a play $\delta$. A pin 5*c* extending from the ring 5 is so located as to engage with a lever 10 which serves as a zero-return lever and is in engagement with a counter. A ratchet wheel 12 is biased by a spring (not shown) in the direction indicated by the arrow A (counterclockwise direction). A disk 13 for indicating a time-delay action of the self-timer is coaxially fixed to the ratchet wheel 12 so that a delay time may be set and indicated by means of graduated scales (numerals) and a fixed index mark 14. The lever 10 has at its one end a pawl 10a for engagement with the ratchet wheel 12 and at the other end an engaging pawl 10b located above the path of the pin 5c.

Next the mode of operation will be described. It is assumed that the device of the present invention may be reset upon winding the film. Upon winding of the film, the switch $S_1$ is turned off; the switch $S_2$ is turned on; and the switch $S_3$ is switched to the fixed contact a. The value of the resistor Rs may be set in accordance with the angle of rotation (in the direction indicated by the arrow B) of the disk 13, that is a desired time delay. Upon depression of the shutter release button 1 against the spring 2, the switch $S_1$ is turned on by the rod member 1a and thereafter when the lever 3 is fitted into the annular groove 1b, the switch $S_2$ is opened. Thus, the magnet $M_2$ is energized while the magnet $M_1$ is de-energized. When the switch $S_2$ is opened, the capacitor C in the Rs C time constant circuit is charged so that after a predetermined time interval, the magnet $M_2$ is de-energized while the magnet $M_1$ is energized. Thus the action of the self-timer is accomplished. When the magnet $M_1$ is energized while the magnet $M_2$ is de-energized, the stepped portion 6a is released from the hook 6a of the lever 6 so that the shutter-blade-opening ring 4 may be rotated under the force of the spring 15 in the clockwise direction. Simultaneously the shutter-blade-closing ring 5 which has been locked in position by the pin 4c of the ring 4 starts to rotate but is prevented from rotation because the spring 9 for returning the hooked lever 8 actuated by the magnet $M_2$ is so adjusted that the hook 8a may engage with the stepped portion 5a of the ring 5 before the play $\delta$ between the stepped portion 5a of the shutter closing ring 5 and the hook 8a become zero. The shutter-blade-opening ring 4 switches the switch $S_3$ from the terminal a to b by the projection 4b after the ring 4 has rotated through the angle $\theta$ while simultaneously opening the shutter blades. Subsequently the electron charges charged in the capacitor C is discharged through the photoconductive cell P so that after a predetermined time interval determined by CP time constant circuit the magnet $M_2$ is energized while the magnet $M_1$ is de-energized. In consequence, the stepped portion 5a of the ring 5 is released from the hook 8a of the lever 8 so that the shutter-blade-closing ring 5 is rotated under the force of the spring 16 to thereby close the shutter so as to complete the exposure. Upon completion of the exposure the pin 5c of the ring 5 engages with the end 10b of the ratchet lever 10 so that the latter is caused to rotate in the counterclockwise direction to thereby release the ratchet wheel 12. In consequence the ratchet wheel 12 is caused to rotate in the direction indicated by the arrow A to its initial position. Since the time-delay setting disk 13 is reset to its initial position by the shutter-blade-closing ring 5, it is not necessary to reset the disk 13 so that the use of the camera may be much facilitated.

Upon adjustment of the resistor Rs, the resistor Ro in the lamp control circuit including the transistors $T_4$, $T_5$ and $T_6$ is also set so that the sensitivity of the Schmitt circuit consisting of the transistors $T_4$ and $T_5$ may be varied. In this case, the circuit constant of the Schmitt circuit including the resistor Ro is so adjusted that the transistor $T_6$ may be rendered into the conductive state before a predetermined time (for example 0.5 sec) and the magnet $M_2$ is de-energized while the magnet $M_1$ is energized. For this purpose both of the Schmitt circuits are so designed as to hold the following relation:

$$V_T < V_L$$

where $V_T$ = the base potential of the transistor $T_2$, and $V_L$ = the base potential of the transistor $T_5$, regardless of the variation of the charging characteristic of the base potential Vc of the transistor $T_4$ determined by the resistor Rs. Therefore by the coaction of the resistors Rs and Ro a time interval required for the voltage Vc across the capacitor C to exceed the voltage $V_T$ and become the voltage $V_L$ may be maintained constant. When the breakdown voltage of the Zener diode is $V_D$, the following relation is held:

$$V_T < V_L < V_D$$

Because of the voltage relation described above, a predetermined time interval after the self-timer is started that is immediately before the action of the self-timer is completed, the transistor $T_6$ is rendered into the conductive state so that the lamp L is turned on thereby indicating the start of the exposure. The value of the resistor $R_{13}$ is so selected as to flow the current capable of turning on the lamp L. It may be so designed that the electric current flows through the lamp L only when the transistor $T_6$ is on, that is the value of the resistor $R_{13}$ is so selected that the current flowing through the resistor $R_{13}$ is not enough to turn on the lamp L while the auxiliary capacitor C′ is connected in parallel with the resistor $R_{13}$ so that the lamp L may be turned on by the transient current flowing through the capacitor C′ only when the transistor $T_6$ is turned on. This simple arrangement serves to warn the completion of the action of the self-timer or the starting of the exposure. In the embodiment illustrated in FIG. 3 the warning is given when the lamp is turned off while in the embodiment illustrated in FIG. 4, the warning is given when the lamp is turned on. Alternatively the lamp may be flashed. In addition instead of the lamp a buzzer or the like may be employed in a similar manner but the detailed description will not be made as it is clear from the description above.

In brief, the control of the self-timer as well as the exposure time may be accomplished by the charging and discharging of the common capacitor. That is, the common circuit may be employed for controlling the self-timer as well as the exposure time. In addition the self-timer may be indicated as being in operation by turning on or off or flashing the lamp when the capacitor is charged. When the common control circuit is not employed, the resistor $R_4$ in the exposure time control circuit may be interlocked with the resistor Rs in the self-timer control circuit so that the time interval between the time the action of the self-timer is completed and the time the shutter is opened may be set to for example 0.5 sec.

In accordance with the present invention, prior to the completion of the electronic self-timer incorporating the time constant circuit and the control circuit for controlling the time, a warning device such as a lamp, a buzzer or the like may be actuated so as to indicate before the completion of the action of the self-timer or the starting of the exposure. Therefore the use of the cameras incorporating the electronic self-timers in accordance with the present invention may be such facilitated. In addition the electronic self-timer in accordance with the present invention which is simple in construction may be incorporated in an electronic shutter. The electronic self-timer in accordance with the present invention may be designed as a digital self-timer which may be employed as an accessory unit of a digital shutter actuated by a pulse counter. Alternatively the electronic self-timer in accordance with the present invention may be employed as a timer for a slow shutter and in this case the design for flashing the warning lamp may be much simplified.

What is claimed is:

1. An electronic shutter including a self-timer and comprising:
- capacitor means adapted to be energized by a power source;
- first resistor means for defining with said capacitor when charging, the time constant of the self-timer;
- second resistor means for defining with said capacitor when discharging, the time constant for an exposure;
- means to selectively connect said capacitor to said first and second resistors;
- a shutter operating mechanism;
- means in response to said capacitor charging to a first predetermined value for actuating said shutter operating mechanism to open the shutter and for completing the operation of the self-timer; and
- means in response to said capacitor discharging to a second predetermined value for actuating said shutter operating mechanism to close the shutter thereby completing an exposure.

2. An electronic shutter according to claim 1, wherein said second resistor means is a photoconductive element for automatically controlling the exposure.

3. An electronic shutter according to claim 1, wherein said first resistor means is a variable resistor capable of varying the operating time interval of the self-timer.

4. An electronic shutter according to claim 1, wherein said shutter operating mechanism includes a shutter opening mechanism and a shutter closing mechanism.

5. An electronic shutter according to claim 1, and further comprising indicating means which operates in conjunction with the completion of the operation of the self-timer.

6. An electronic shutter according to claim 3 further including reset means to reset said variable resistor to an initial set position, said reset means being responsive to the opening of the shutter after completion of the operation of the self-timer, and irrespective of the value of said variable resistor.

7. An electronic shutter including a self-timer and comprising:
- a capacitor means adapted to be energized by a power source;
- a first resistor means for defining with said capacitor when charging, the time constant of the self-timer;
- a second resistor means for defining with said capacitor when discharging, the time constant for an exposure;
- means to selectively connect said capacitor to said first and second resistors;
- a shutter operating mechanism;
- means in response to said capacitor charging to a first predetermined value for actuating said shutter operating mechanism to open the shutter and for completing the operation of the self-timer;
- means in response to said capacitor discharging to a second predetermined value for actuating said shutter operating mechanism to close the shutter thereby completing an exposure;
- detecting means for detecting a voltage across said capacitor slightly less than said first predetermined value to which said capacitor charges; and
- indicator means operable in response to said detected voltage.

8. An electronic shutter according to claim 7, wherein said first resistor means is a variable resistor capable of varying the operating time interval of the self-timer.

9. An electronic shutter according to claim 8, further comprising an additional variable resistor adapted to be set in conjunction with said variable resistor and controlling the value of the voltage to be detected.

10. An electronic shutter according to claim 7, wherein said indicator means includes a further capacitor connected to said detecting means and wherein said indicator means is energized by a transient current flowing through said further capacitor.

* * * * *